United States Patent [19]
Kobayashi

[11] Patent Number: 5,606,381
[45] Date of Patent: Feb. 25, 1997

[54] PHOTOGRAPHIC CAMERA

[75] Inventor: Kiyotaka Kobayashi, Asaka, Japan

[73] Assignee: Fuji Photo Film Co., Ltd., Kanagawa, Japan

[21] Appl. No.: 449,577

[22] Filed: May 24, 1995

[30] Foreign Application Priority Data

May 24, 1994 [JP] Japan .................................. 6-109499

[51] Int. Cl.⁶ .............................. G03B 1/18; G03B 1/00; G03B 17/02
[52] U.S. Cl. ........................... 396/284; 396/406; 396/535
[58] Field of Search .......................... 354/173.1, 173.11, 354/215, 217, 218, 288

[56] References Cited

U.S. PATENT DOCUMENTS

| | | | |
|---|---|---|---|
| 4,721,970 | 1/1988 | Beaver | 354/21 |
| 4,972,214 | 11/1990 | Shibayama et al. | 354/173.1 |
| 5,049,908 | 9/1991 | Murakami | 354/173.1 |
| 5,345,286 | 9/1994 | Stiehler | 354/173.1 |

*Primary Examiner*—Safet Metjahic
*Assistant Examiner*—John Chizmar
*Attorney, Agent, or Firm*—Sughrue, Mion, Zinn, Macpeak & Seas

[57] ABSTRACT

A camera equipped with a device, for photoelectrically detecting perforations formed in a film margin, which comprises two elements, one of which is disposed in a space with at least one end slope formed between inner and outer film guide rails so as to keep a film traveling across the back of the camera away and isolated from coming into contact with the element.

24 Claims, 5 Drawing Sheets

PHOTOGRAPHIC CAMERA

BACKGROUND OF THE INVENTION

1. Field of the Invention

The present invention relates to a photographic camera with a perforation detection device for detecting perforations of a roll film travelling across the back of the camera, and, in particular, to a photographic camera with a perforation detection device for photoelectrically detecting perforations of a roll film in which the film is prevented from being brought into contact with an photoelectric element of the perforation detection device during movement of the film as they pass the back the camera.

2. Description of Related Art

Much attention has been given to various approaches relating to structures which protect elements of a photoelectric means or device for photoelectrically detecting perforations of a film across over an exposure window of a camera. One of typical photoelectric devices comprises two separate elements, a light emitting and receiving photoelectric element and a light reflective element, or otherwise a light emitting element and a light receiving photoelectric element, disposed to face each other and allow a margin of a film in which perforations are formed to travel therebetween. When any one of the perforations is between the two elements, light emitted from the light emitting element is allowed to travel directly, or otherwise after reflection by the light reflective element, to the light receiving photoelectric element through the specific perforation. When the light receiving photoelectric element receives light passed through the specific perforation, it outputs an electric signal, detecting the specific perforation to control advancement of the film and, if necessary, other elements of the camera.

Because the two elements are disposed in close proximity to a film traveling therebetween to face each other, the film is apt to be brought into contact with either one or both of the elements. If the elements are repeatedly rubbed by the film, they suffer deterioration in photoelectric characteristics. For instance, the light reflective element is of the type having a thin sheet element coated with a thin reflective layer, the thin reflective layer can be damaged when repeatedly rubbed, leading to failures of perforation detection.

In order for the photoelectric perforation detection device of this kind to protect the elements from being rubbed by film, it is typical to place these elements in recesses or grooves having a depth sufficient to prevent film from coming into contact with the element. However, such a recess or groove forms a difference in level in the path in which a film travels which possibly catches the leader of the film, thus scratching the film and/or impeding advancement of the film. In particular, when the camera with such a structure for receiving an element of the photoelectric perforation detection device is loaded with film of the type having an open notch along a lateral edge such as described in Japanese Laid-Open Patent No. 3-168731, the difference provided by the recess almost always serves as an obstacle to movement of the film and often the notch is brought into engagement with the recess.

SUMMARY OF THE INVENTION

It is an object of the present invention to provide a camera with a structure which enables film to travel without coming into contact with an element of a photoelectric perforation detection device and being impeded by the structure.

The above object of the present invention is achieved by providing a camera for use with a roll film, formed with a row of perforations formed in at least one lengthwise margin thereof, which travels across an exposure window formed at the back of the camera body. The camera is provided with a photoelectric detection means, for photoelectrically detecting perforations during movement of the film from a cartridge chamber on one side of the exposure window to a film take-up chamber on another side of the exposure window, which comprises at least two separate elements facing each other with a space therebetween to allow the film to travel through the space. In order to receive either one of these elements, a space is provided right below a path of the perforations. The space is comprised of an open cavity sunk downward from a plane in which a film travels, or otherwise by and between a pair of projections or banks extending upward to the plane so that the space has at least at one end in the lengthwise direction thereof an end slope at an acute angle with the plane and a depth sufficient to isolate the margin of film from the one element placed therein.

The space may have the end slope at either one end or both ends in the lengthwise direction thereof. Each end slope may have a flat surface, a concave surface or a convex surface.

The photoelectric detection means includes an infrared light emitting and receiving unit, comprising an infrared light emitting element, such as an infrared light emitting diode, and a photoelectric element sensitive to infrared light.

With the camera of the present invention, during movement of the film leader, even if the leader of the film 23 is curled to come into the space, it is forced to slide upward along the front and/or rear end slopes of the space means. Further, similarly, even if the lateral open notch is brought into engagement with the front and/or rear end slope of the space, the portion of the film leader where the lateral open notch is formed is forced to slide upward so that the open notch passes over the ends of the space. Consequently, the film leader is always mechanically isolated from the element of the photoelectric detection means and, consequently, does not in any way come into contact with the same during the movement of the film. Once the film leader reaches the film take-up chamber and is wound around the take-up spool, it is guided smoothly by and along guide rails.

BRIEF DESCRIPTION OF THE DRAWINGS

The above and other objects and features of the present invention will be clearly understood from the following description with respect to a preferred embodiment thereof when considered in conjunction with the accompanying drawings, wherein like reference numerals used throughout the drawings denote the same or similar elements or parts, and in which.

DETAILED DESCRIPTION OF THE PREFERRED EMBODIMENTS

Because the film drive mechanism, the exposure mechanism and other mechanisms which are necessary to a photographic camera are well known to those skilled in the art, the description will be directed in particular to elements and parts forming part of, or cooperating directly with, apparatus and structure in accordance with the present invention. It is to be understood that elements and parts neither of direct importance to the invention and purely of conventional construction nor specifically shown or described can take various forms well known to those skilled in the photographic art.

Figure 1:
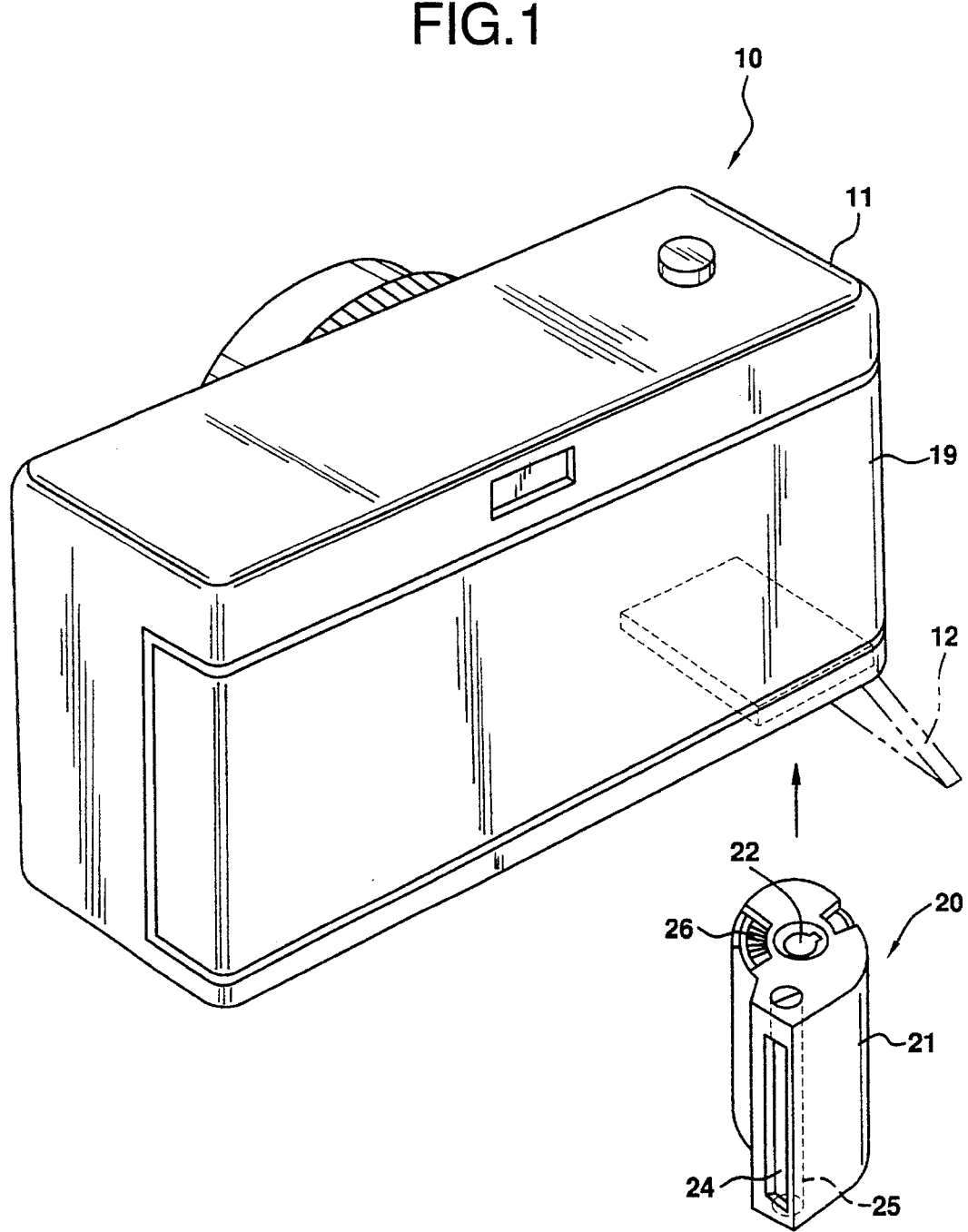
FIG. 1 is a perspective view of a camera in accordance with an embodiment of the present invention.

Referring now to the drawings in detail, and in particular, to FIGS. 1 and 2, a photographic camera 10 is shown, which is designed and adapted to use with film cartridges 20, which are of a new type having recently been proposed and which are described below. The camera 10 has a camera housing or body 11 the back of which is covered by a back cover 19. The camera body 11 is provided with a cartridge chamber (not shown) on one side of an exposure window 13. A bottom door 12 is opened and closed to enable the film cartridge 20 to be loaded into the cartridge chamber from the bottom and to be unloaded from it. The camera body 11 has a take-up spool 18 in a film take-up chamber (not shown) provided on another side of the exposure window 13 remote from the cartridge chamber.

The film cartridge 20 comprises a generally cylindrically-shaped film container 21 and a spool 22 held for rotation in the container 21. A roll film 23 (see FIG. 2) having a number of, for example 24, exposure frames, is wound on the spool 22. The film container 21 has a slot or opening 24 through which the film 23 is withdrawn out from and drawn into the film container 21 and a flap-like light shielding door 25 which in turn is supported for pivotal movement by the film container 21. This light shielding door 25 is urged to close the slot 24 and keeps the inside of the film container 21 light tight. The light shielding door 25 is forced by a door drive mechanism incorporated within the camera body 11 to swing back to open the slot 24 in cooperation with closing the bottom door 12 after loading the film cartridge 20 into the cartridge chamber, thereby allowing the film leader 23a to be withdrawn out from and drawn into the film cartridge 20. The film cartridge 20 is further provided with a magnetic data disk 26, for storage of information on a film and exposure frames of the film, rotatively mounted within the film container 21. The information may include standard or general information on each frame having been prerecorded before use and specific information on exposure of the frame recorded upon exposure. This magnetic data disk 26 is rotatable in cooperation with the spool 22 so as to place parts of the magnetic data disk 26 at access windows 21a and 21b. Magnetic heads (not shown) access the magnetic disk 26 through the access windows 21a and 21b to read information on a particular exposure frame behind the exposure window 13 and/or write new information on exposure on the particular exposure frame. This new type of film cartridge 20 contains a roll of film 23 which in turn is formed with a notch 27 (see FIG. 6) laterally opening in the leader portion 23a thereof and a row of perforations 28 at regular intervals in the lengthwise direction in at least an upper margin thereof. This notch 27 serves as a retainer means capable of engaging with a flange (not shown) disposed in close proximity to the spool 23 for preventing the film 23 from being fully wound around the spool 23 when the film 23 is rewound so as to enable the film 23 to be smoothly withdrawn again out of the film container 21. A detailed description of a representative example of such a film cartridge and a film of this type is contained in Japanese Unexamined Patent Publication No. 3-168731.

Figure 2:
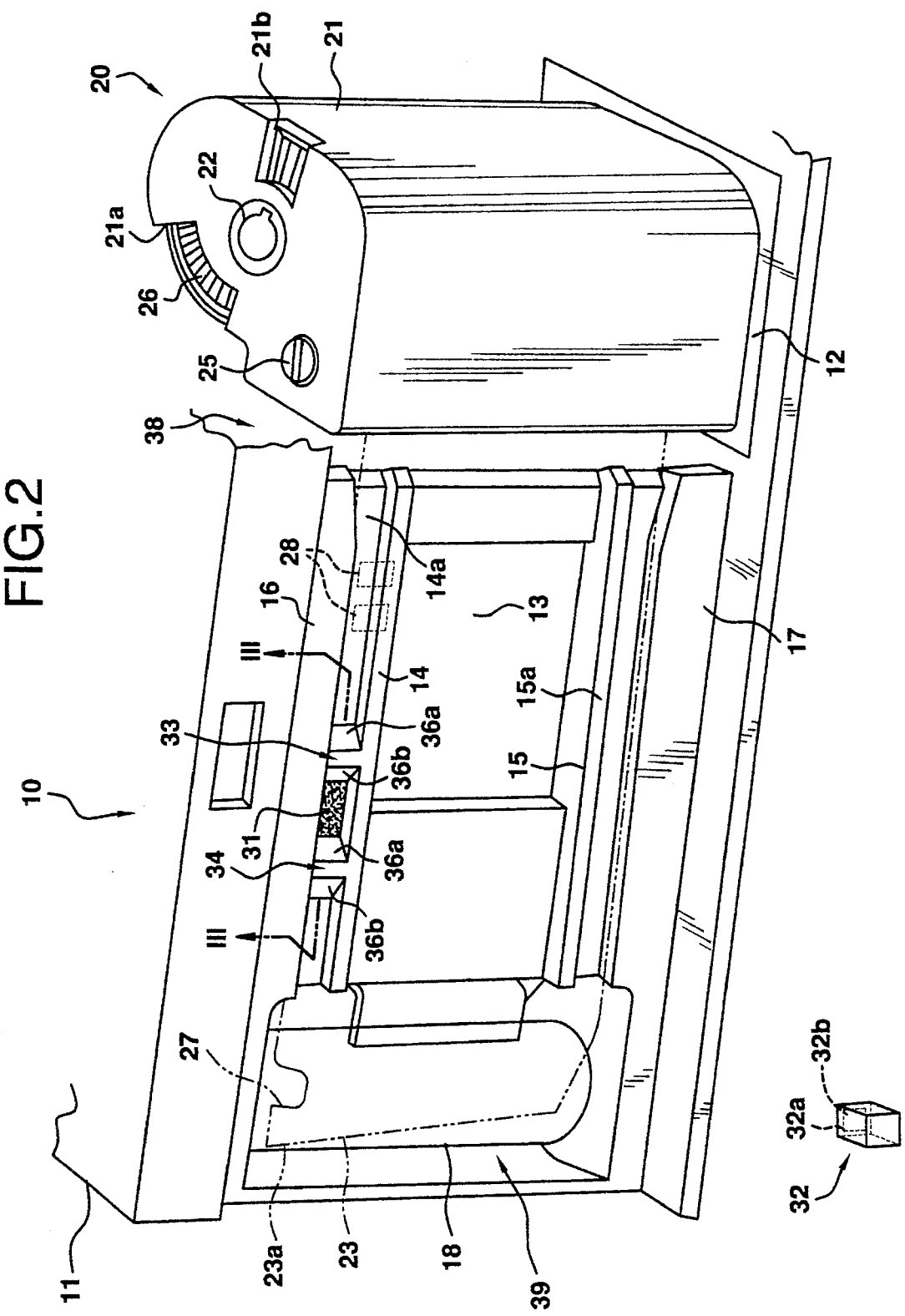
FIG. 2 is a perspective view of the interior of the camera shown in FIG. 1.

As shown in FIG. 2 showing details of the interior of the camera 10, the camera body 11 has a pair of inner film guide rails 14 and 15, disposed on transversely opposite sides of the exposure window 13, respectively, which extend in the lengthwise direction from the cartridge chamber to the film take-up chamber. Similarly, the camera body 11 has a pair of outer film guide rails 16 and 17 on transversely opposite sides of the exposure window 13, respectively, which extend in parallel with the inner film guide rails 15 and 17. The upper inner and outer guide rails 14 and 16 are separated from each other so as to form a lengthwise groove 14a therebetween. Similarly, the lower inner and outer guide rails 14 and 16 are separated from each other so as to form a lengthwise groove 15a therebetween. At least either one of these upper and lower pairs of inner and outer guide rails, for instance the upper pair of inner and outer guide rails 14 and 16, are disposed such that they guide the upper margin of the film 23 to constrain the perforations 28 in a path above the groove 14a during movement of the film 23 across the back of the exposure window 13.

The camera 10 is further provided with a photoelectric detection means for detecting perforations when the film 23 travels across the back of the exposure window 13. The photoelectric detection means comprises two separate elements, namely a light emitting and receiving unit 32 and a light reflector 31. Either one of these separate elements is disposed in an open space or cavity 30A provided in the lengthwise groove 14a and the other is attached to the back cover 19 so as to face the open cavity 30A. In this instance, one of the separate elements, i.e. the light reflector 31, is adhered, or otherwise secured, to the bottom of the open cavity 30A. The other, i.e. the light emitting and receiving unit 32, is fixedly attached to the back cover 19. With the photoelectric detection means, the light emitting and receiving unit 32 emits infrared light toward the light reflector 31 and receives infrared light reflected by the light reflector 31. Because the open cavity 30A is in the lengthwise groove 14a, the perforations 28 in the upper margin of the film 23 travel in the path between the light reflector 31 and the light emitting and receiving unit 32 and allow light to travel between them.

The light emitting and receiving unit 32 comprises an infrared light emitting element 32a, such as an infrared light emitting diode, for emitting infrared light toward the light reflector 31 and an infrared light receiving element 32b for receiving infrared light reflected by the light reflector 31 to generate an electric signal. The light reflector 31 comprises a generally rectangular-shaped, thin light reflective element having a peak sensitivity to infrared light. These light emitting and receiving unit 32 and thin light reflector 31 may be exchanged in position with each other. Various photoelectric detection means of this kind are well known in the art and may take any type well known to those in the art.

The photoelectric detection means detects perforations of the film 23 which are located between the light emitting and receiving unit 32 and light reflector 31 when the film 23 is advanced across the exposure window 13 and generates electric signals, one for each perforation.

Figure 3:
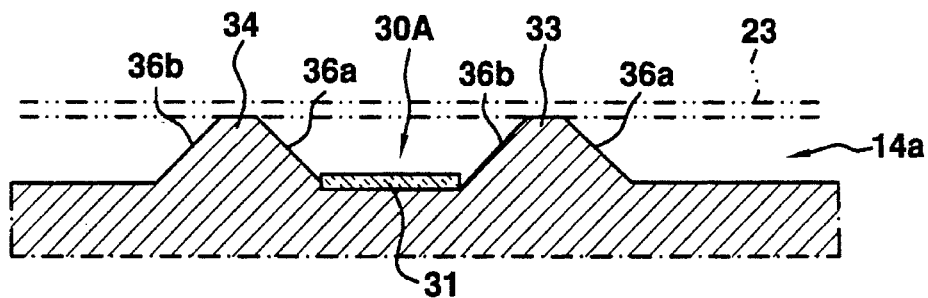
FIG. 3 is a cross-sectional view of a space means taken along line III—III of FIG. 2.

Referring to FIG. 3 showing details of the part of upper groove 14a where the thin light reflector 31 is received in and adhered to the open cavity 30A, a pair of generally isosceles triangular-shaped banks or projections 33 and 34 are provided to form an open space or open cavity 30A, each of which extends upward to a plane in which the film 23 travels and receives the thin light reflector 31 (which is hereunder referred to as a film plane). The top of each bank 33, 34 is cut away so as to be flush with the top surface of the inner guide rail 14. These banks 33 and 34 and the upper groove 14a are configured to form the open cavity 30A having a depth and length suitable for the film 23 to be prevented from coming into contact with the thin light reflector 31 while traveling over the exposure window 13. Both front and rear end slopes 36a and 36b of each bank 33, 34 are at appropriate acute angles of, for instance, approximately 45° relative to the film plane to force the leading edge 23a of the film 23 and the rear edge of the open notch 27 formed in the margin of the film 23 to slide upward, thereby guiding the film 23 forward without catching them during forward and rearward movement of the film 23.

The camera 10 has a door drive mechanism and a spool drive mechanism, which are not shown. The door drive mechanism is brought into engagement with the pivot 25a, or otherwise directly to the light shielding door 25, when the bottom door 12 is closed after loading the film cartridge 20 in the cartridge chamber, so as to turn the light shielding door 25, thereby opening the slot 24. The spool drive mechanism, which includes an electric motor, is brought into direct engagement with the external end of the spool 22 of the film cartridge 20 and automatically rotates the spool 22 and, if necessary, the take-up spool 10 to pull the leader 23a of the film 23 out of the film container 21 through the slot 24 and advance it to across over the exposure window 13 subsequently to opening the light shielding door 25 until the leader 23a of the film 23 is engaged by the take-up spool 18 in the film take-up chamber. Further, the spool drive mechanism automatically rotates the spools 10 and 22 to advance the film 23 by one frame every exposure and wind it around the take-up spool 18. After exposure of all frames, or after exposure of some frames as required, the spool drive mechanism reversely rotates the spools 10 and 22 to rewind the film 23 into the film container 21.

In the operation of the camera 10, when loading the film cartridge 20 in the cartridge chamber, the door drive mechanism and the spool drive mechanism are brought into direct engagement with the pivot 25a and the external end of the spool 22, respectively. In cooperation with closing the bottom door 12, the door drive mechanism turns the pivot 25a to turn the light shielding door 25 to open the slot 24 and the spool drive mechanism is subsequently actuated to rotate the spool 22 automatically to pull the leader 23a of the film 23 out of the film container 21 through the slot 24 and advance it toward the film take-up chamber across over the exposure window 13. During the advancement of the film leader 23a, even if the leader 23a of the film 23 is curled to be apt to come into contact with the bank 33 and/or the bank 34, it is forced to slide upward along the front end slope 36a. Further, similarly, even if the open notch 27 is brought into engagement with the front end slope 36a of each bank 33, 34, the front end slope 36a forces the film leader 23a to slide upward so that the open notch 27 passes over the banks 33 and 34. Consequently, the film leader 23a is always kept away and mechanically isolated from the thin light reflector 31 and, consequently, does not in any way come into contact with the thin light reflector 31 during the advancement of the film 23. Once the film reader 23a reaches the film take-up chamber and is wound around the take-up spool 18, the film 23 is guided along and kept flat by the guide rails 14–15. The rear end slope 36b of each bank 33, 34 serves in the same manner with respect to the film leader 23a of the film 23 when the film 23 is rewound from the film take-up chamber into the film container 21 in the cartridge chamber. The isolation of the film leader 23a from the thin light reflector 31 by means of the open cavity 30A formed by and between the banks 33 and 34 assures smooth film advancement and prevents the thin light reflector 31 from being damaged by contact with the film 23.

When the spool drive mechanism rotates the spool 22 to advance the film 23, the infrared light emitting element 32a of the light emitting and receiving unit 32 is energized to emit infrared light toward the thin light reflector 31. Before the film 23 is advanced and places a perforation 28 thereof in a position between the light emitting and receiving unit 32 and the light reflector 31, the infrared light is reflected by the film 23. In this instance, since the film surface has no reflective characteristics, or otherwise has a considerably weak index of reflection to infrared light, the infrared light receiving element 32b does not sense infrared light if infrared light is reflected by the film 23, so that it does not provide any electric signal of a predetermined level. Unless the infrared light receiving element 32b provides an electric signal of the predetermined level, the spool drive mechanism continues its operation to advance the film 23. However, with the progress of film advancement, a perforation 28 reaches the position between the unit 32 and reflector 31 and allows the infrared light emanating from the infrared light emitting element 32a to reach the infrared light receiving element 32b and, after reflection by the infrared light receiving element 32b, travels back to and impinges upon the infrared light receiving element 32b, without being intercepted by the film 23. As a result, the infrared light receiving element 32b receives infrared light, sufficiently high in intensity to generate the predetermined level of electric signal. Upon the presence of an electric signal, the spool drive mechanism causes its electric motor to suspend its operation, and thus the advancement of the film 23, thereby placing the particular frame related to the particular perforation at the exposure window 13. The spool drive mechanism resumes the operation of the electric motor automatically after the completion of exposure for the particular frame to further advance the film 23.

In the case where the film 23 has more-than-one perforation for each frame, a single electric signal may be provided for the specified number of the predetermined signals provided by the infrared light receiving element 32b to stop the operation of the electric motor of the spool drive mechanism.

The electric signal may be used to govern other electrically controlled elements and mechanisms other than or in addition to the spool drive mechanism.

Figure 4:
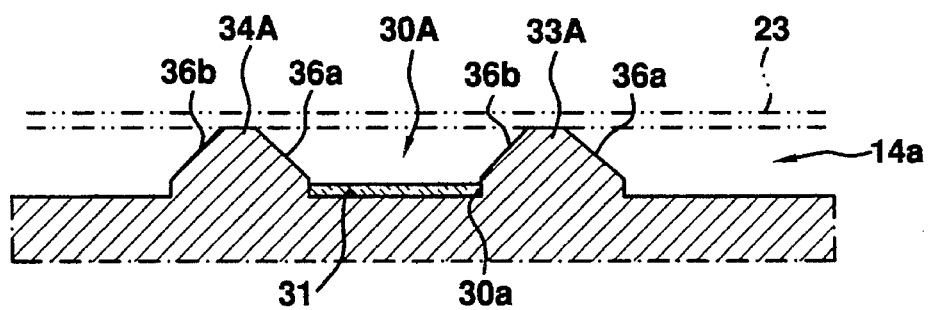
FIG. 4 is a cross-sectional view of a variation of the space means of the camera.

Referring to FIG. 4 showing a variation of the above embodiment, each of generally isosceles triangular-shaped banks or projections 33A and 34A may be configured to have front and rear end slopes 36a and 36b, having appropriate acute angles of, for instance, approximately 45° relative to the film plane in which the film 23 travels, between which an open cavity 30A is formed. The open cavity 30A is formed with a generally U-shaped bottom bed or channel 30a at and between front and rear vertical bases of the banks 33A and 34A. The U-shaped bottom channel 30a is adapted to have a depth slightly deeper than the thickness of a thin light reflector 31 to receive the thin light reflector 31 snugly therein.

In this variation, the front and rear end slopes 36a and 36b slide the film leader 23a upward during movement of the film 23 and keep it isolated from the thin light reflector 31. Consequently, the film leader 23a is prevented from being engaged by the banks 33A and 34A and coming into contact with the thin light reflector 31 during the advancement of the film 23 in any direction.

Figure 5:
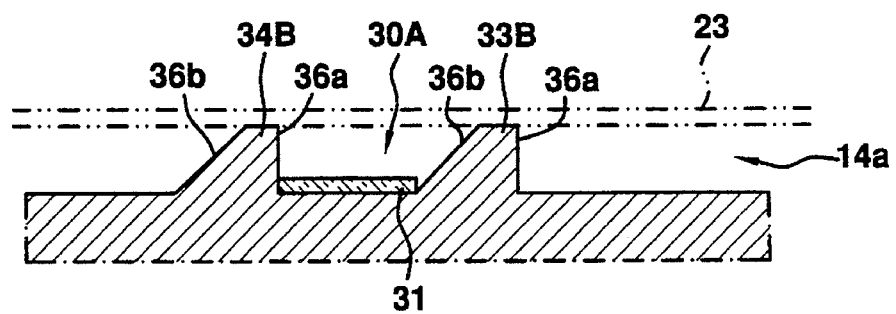
FIG. 5 is a cross-sectional view of another variation of the space means of the camera.

Referring to FIG. 5 showing another variation of the above embodiment, each of generally right triangular-shaped banks or projections 33B and 34B may be configured to have a vertical front end 36a and a rear end slope 36b having an appropriate acute angle of, for instance, approximately 45° relative to the plane in which the film 23 travels, between which an open space or cavity 30A is formed for receiving a thin light reflector 31. The top of each bank 33B, 34B is cut away to be flush with the top surface of the inner guide rail 14. The configuration of these banks 33B and 34B is desirable for the film which has the possibility of engagement with the banks 33B and 34B during film movement not from the cartridge chamber to the film take-up chamber but from the film take-up chamber to the cartridge chamber. However, if the film has the possibility of engagement with the banks 33B and 34B during film movement from the cartridge chamber to the film take-up chamber only, each bank 33B, 34B may be formed with a front end slope 36a and a vertical rear end 36b.

Figure 6:
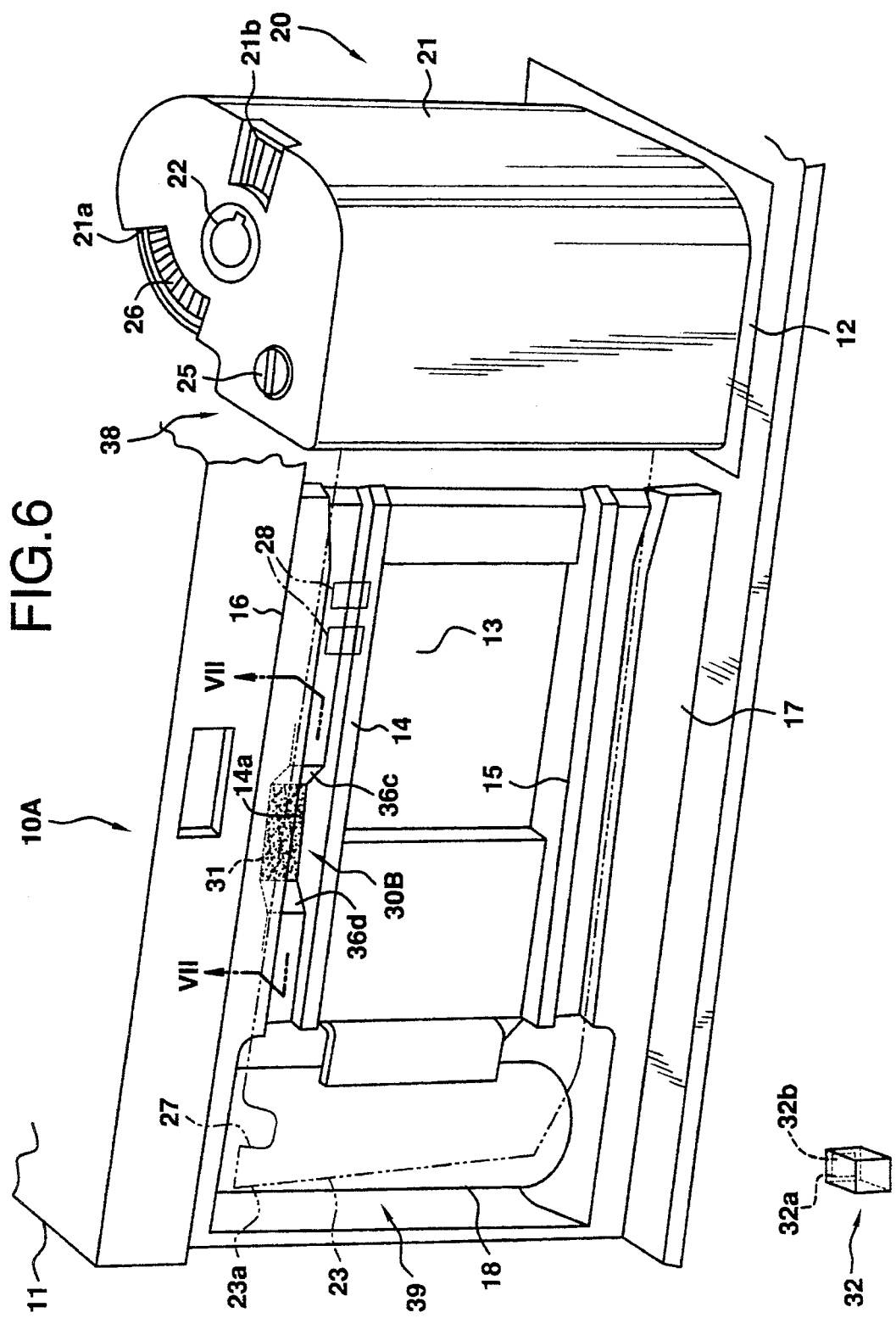
FIG. 6 is a perspective view of the interior of a camera in accordance with another embodiment of the present invention.
Figure 7:
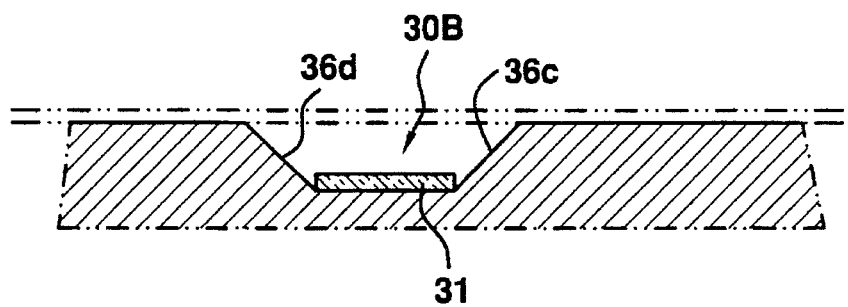
FIG. 7 is a cross-sectional view of a space means taken along line VII—VII of FIG. 6.

FIGS. 6 and 7 show a camera 10A in accordance with another preferred embodiment of the present invention. The camera 10A is characterized in that an open space or cavity 30B sunk downward below a plane in which a film travels, for receiving therein either one of a thin light reflector 31 or a light emitting and receiving unit 32, both forming a photoelectric detection means for detecting film perforations, is defined in place of the open space 30A formed between the banks extending upward to the plane the previous embodiment. A camera body 11 has a pair of inner film guide rails 14 and 15, disposed on transversely opposite sides of an exposure window 13, respectively, which extend in a lengthwise direction in which a film 23 travels across over the back of the exposure window 13. Similarly, the camera body 11 has a pair of outer film guide rails 16 and 17 on transversely opposite sides of the exposure window 13, respectively, which extend in the lengthwise direction. The upper inner and outer film guide rails 14 and 16 are disposed in parallel with each other and provided with a separation so as to form a lengthwise groove 14a therebetween. Similarly, the lower inner and outer guide rails 15 and 17 are disposed in parallel with each other and provided with a separation to form a lengthwise groove 15a therebetween. At least either one of these upper and lower pairs of guide rails 14–17, for instance the upper pair of inner and outer guide rails 14 and 16, are disposed to place the groove 14a in the path of perforations 28 formed in the upper margin of the film 23.

The upper groove 14a has an open cavity 30B formed therein in a form of reversed trapezoid in which the thin light reflector 31 is received and adhered. Each of front and rear end slope 36c and 36d of the open cavity 30B is at an appropriate acute angles of, for instance, approximately 45° relative to the film plane in which the film 23 travels. Similarly to the previous embodiment, these end slopes 36c and 36d of the open cavity 30B force the leading edge 23a of the film 23 and the rear edge of the open notch 27 formed in the margin of the film 23 to slide upward during movement of the film 23 toward and from the film take-up chamber, thereby preventing the film leader 23a from coming in contact with the thin light reflector 31.

Figure 8:
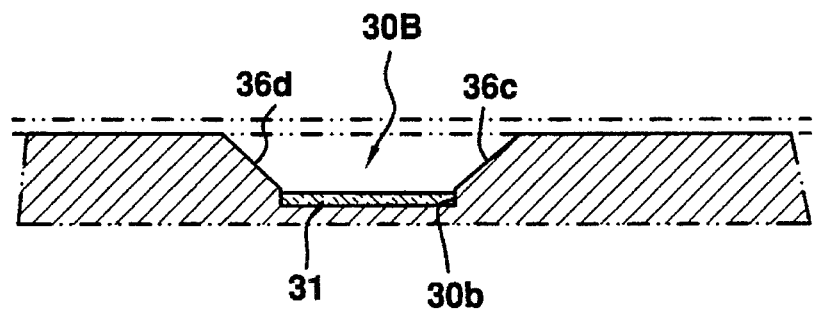
FIG. 8 is a cross-sectional view of a variation of the space means of the camera.

FIG. 8 shows a variation of this embodiment. A generally reversed trapezoid-shaped open cavity 30B is configured to have front and rear end slopes 36c and 36d, having appropriate acute angles of, for instance, approximately 45° relative to the film plane, between which an open space or cavity 30B is formed. At the bottom, the open cavity 30B is formed with a generally U-shaped bottom bed or channel 30b between the end slopes 36c and 36d. The U-shaped bottom channel 30b is adapted to have a depth slightly deeper than the thickness of a thin light reflector 31 to receive the thin light reflector 31 snugly therein.

In this variation, the front and rear end slopes 36c and 36d slide the film leader 23a upward during movement of the film 23 and keep it isolated from the thin light reflector 31. Consequently the film leader 23a is prevented from coming into contact with the thin light reflector 31 during the movement of the film 23 in any direction.

Figure 9:
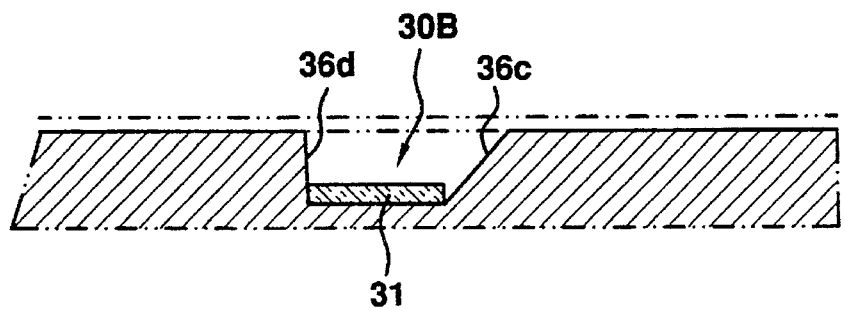
FIG. 9 is a cross-sectional view of another variation of the space means of the camera.

Referring to FIG. 9 showing another variation of the second embodiment, an open space 30B for receiving a thin light reflector 31 is configured to have a front end slope 36c at an appropriate acute angle of, for instance, approximately 45° relative to the film plane and a vertical rear end 36d. This configuration of the open cavity 30B is desirable for the film 23 which has the possibility of engagement by the end of the open cavity 30B during film movement in the rewinding direction only. However, if the film 23 has the possibility of engagement by the end of the open cavity 30B during in the advancing direction only, the open cavity 30B may be formed with a vertical front end 36c and a rear end slope 36d.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A camera for use with a roll film with a row of perforations formed in at least one lengthwise margin thereof, said film traveling across an exposure window which is formed at a back portion of a camera body and covered by a back cover, said camera comprising:

photoelectric detection means for photoelectrically detecting said perforations during movement of said film in a lengthwise direction past said exposure window, said detecting means comprising at least two separate elements which face each other with a space defined therebetween through which said film travels; and means for defining a space right below a path of said perforations which receives one of said two separate elements therein so as to maintain said one element mechanically isolated from said margin of said film, said space having, at least at one end in said lengthwise direction thereof, a slope at an acute angle with respect to a plane in which said film travels.

2. A camera as defined in claim 1, wherein said means for defining a space is a cavity recessed below said plane.

3. A camera as defined in claim 2, wherein said space has said slope at one end thereof in said lengthwise direction.

4. A camera as defined in claim 2, wherein said space has said slope at another end thereof in said lengthwise direction which is opposite said one end.

5. A camera as defined in claim 2, wherein said space has said slope at both ends thereof in said lengthwise direction thereof.

6. A camera as defined in claim 1, wherein said space is formed by and between a pair of banks extending upward to said plane.

7. A camera as defined in claim 6, wherein said space has said slope at one end thereof in said lengthwise direction.

8. A camera as defined in claim 6, wherein said space has said slope at another end thereof in said lengthwise direction which is opposite said one end.

9. A camera as defined in claim 6, wherein said space has said slope at both ends in said lengthwise direction thereof.

10. A camera as defined in claim 1, wherein said detecting means includes an infrared light emitting and receiving unit and a light reflector having a peak index of reflection to infrared light for said two separate elements, said light emitting and receiving unit emitting infrared light toward said light reflector and receive infrared light reflected by said light reflector.

11. A camera as defined in claim 10, wherein said light reflector comprises a thin light reflective sheet and forms said one element.

12. A camera as defined in claim 10, wherein said light emitting and receiving unit comprises an infrared light emitting element and a photoelectric element sensitive to infrared light and forms said one element.

13. A camera for use with a roll film with a row of perforations formed in at least one lengthwise margin thereof for indicating frame positions and a side notch formed in said one margin in a leader section thereof, said film traveling across an exposure window which is formed at a back portion of a camera body and covered by a back cover, said camera comprising:

photoelectric detection means for photoelectrically detecting said perforations during movement of the film in a lengthwise direction past said exposure window, said detecting means comprising at least two separate elements which face each other with a space defined therebetween through which said film travels; and means for defining a space right above a path of said perforations which receives one of said two separate elements therein so as to maintain said one element mechanically isolated from said margin of said film, said space having, at least at one end in said lengthwise direction thereof, a slope at an acute angle with respect to a plane in which said film travels.

14. A camera as defined in claim 13, wherein said means for defining a cavity space is recessed below said plane.

15. A camera as defined in claim 14, wherein said space has said slope at one end thereof in said lengthwise direction.

16. A camera as defined in claim 14, wherein said space has said slope at another end thereof in said lengthwise direction which is opposite said one end.

17. A camera as defined in claim 14, wherein said space has said slope at both ends thereof in said lengthwise direction thereof.

18. A camera as defined in claim 13, wherein said space is formed by and between a pair of banks extending upward to said plane.

19. A camera as defined in claim 18, wherein said space has said slope at one end thereof in said lengthwise direction.

20. A camera as defined in claim 18, wherein said space has said slope at another end thereof in said lengthwise direction which is opposite said one end.

21. A camera as defined in claim 18, wherein said space has said slope at both ends in said lengthwise direction thereof.

22. A camera as defined in claim 13, wherein said detecting means includes an infrared light emitting and receiving unit and a light reflector having a peak index of reflection to infrared light for said two separate elements, said light emitting and receiving unit emitting infrared light toward said light reflector and receive infrared light reflected by said light reflector.

23. A camera as defined in claim 22, wherein said light reflector comprises a thin light reflective sheet and forms said one element.

24. A camera as defined in claim 22, wherein said light emitting and receiving unit comprises an infrared light emitting element and a photoelectric element sensitive to infrared light and forms said one element.

* * * * *